United States Patent
Kouri, Sr.

(10) Patent No.: US 9,587,973 B2
(45) Date of Patent: Mar. 7, 2017

(54) FLUID RESERVOIR LEVEL DETECTION SYSTEM

(71) Applicant: Reliable Pump Stop, Inc., Simi Valley, CA (US)

(72) Inventor: Matthew D. Kouri, Sr., Simi Valley, CA (US)

(73) Assignee: RELIABLE PUMP STOP, INC., Simi Valley, CA (US)

( * ) Notice: Subject to any disclaimer, the term of this patent is extended or adjusted under 35 U.S.C. 154(b) by 449 days.

(21) Appl. No.: 14/264,866

(22) Filed: Apr. 29, 2014

(65) Prior Publication Data
US 2014/0319931 A1  Oct. 30, 2014

Related U.S. Application Data

(60) Provisional application No. 61/817,024, filed on Apr. 29, 2013.

(51) Int. Cl.
| | |
|---|---|
| H01H 35/00 | (2006.01) |
| H01H 45/00 | (2006.01) |
| G01F 23/70 | (2006.01) |

(52) U.S. Cl.
CPC ......... *G01F 23/703* (2013.01); *Y10T 307/779* (2015.04)

(58) Field of Classification Search
CPC ............................. G01F 23/30; G01F 23/703
USPC .......................................... 307/118; 340/623
See application file for complete search history.

(56) References Cited

U.S. PATENT DOCUMENTS 5,711,354 A * 1/1998 Siegele ...................... B01J 4/00
141/198

* cited by examiner

*Primary Examiner* — Carlos Amaya
(74) *Attorney, Agent, or Firm* — Kelly & Kelley, LLP

(57) ABSTRACT

A fluid level detection device comprising an elongated shaft having a plurality of sensors and associated switches on a distal end thereof. The distal end of the shaft extends into a liquid reservoir with the switches configured to detect multiple predetermined fluid levels. The first fluid level detected is a warning level indicating that the level of fluid in the reservoir is low and results in a warning indication. The second fluid level detected is for a shutoff threshold that results in shutdown of the device using the fluid in the reservoir and a shutdown indicator.

18 Claims, 4 Drawing Sheets

FLUID RESERVOIR LEVEL DETECTION SYSTEM

This application claims the benefit of U.S. Provisional Application No. 61/817,024, filed on Apr. 29, 2013.

BACKGROUND OF THE INVENTION

This invention relates to a system and apparatus for detecting the level of fluid in a reservoir. More specifically, this invention is directed to a fluid reservoir level detection system designed to detect fluid loss and prevent component failure from loss of fluid and the possibility of a hazmat situation.

There are many devices known in the art for detecting the level of fluid in a reservoir. Such known devices typically comprise a single float or bobber that encloses an air pocket or is otherwise of a lower density than the fluid in the reservoir. The float or bobber is typically disposed at or near the end of a vertically disposed shaft or a horizontally disposed arm. When the level of fluid in the reservoir is above a certain threshold the float or bobber is forced upwards so as to either rise up the vertical shaft or rotate the horizontally disposed arm about a pivoting connection. When the float has risen up the shaft or caused the level arm to rotate upward, a circuit is typically opened so that a sensor light or other alert is off or otherwise not triggered. As the level of fluid in the reservoir decreases, the float drops with the level of the fluid. When the level reaches a certain threshold, the float is lowered to the point where a switch is activated and a circuit closes so as to activate a sensor light or other alert mechanism.

Typically these systems provide only one alert level and are only configured to notify a person that the fluid level is low. Such prior art devices are not configured to detect a second level threshold or otherwise provide a second alert or take corrective action.

Accordingly, there is a need for a fluid reservoir level detection system that detects two or more level thresholds and provides alerts or initiates a cutoff as a designated threshold is reached. Furthermore, there is a need for such a system that can disable or deactivate machines relying upon the fluid in the reservoir when a critical level threshold is reached. Such a system would provide users with more informed knowledge of the fluid level in closed or not easily accessible reservoirs and prevent component failure from loss of fluid. The present invention fulfills these needs and provides other related advantages.

SUMMARY OF THE INVENTION

The present invention is directed to a fluid level detection device and system. The device comprises an elongated shaft having proximal and distal ends. An upper sensor and lower sensor are both independently disposed on the distal end of the shaft. A first switch is fixedly disposed within the distal end of the shaft proximate to and responsive to the upper sensor. A second switch is fixedly disposed within the distal end of the shaft proximate to and responsive to the lower sensor. A multi-wire conductor having a wire connector extends from the proximal end of the shaft with the multi-wire conductor being electrically coupled to the first and second switches. The upper and lower sensors preferably comprise upper and lower floats slidingly disposed on the distal end of the shaft, wherein both of the upper and lower floats are buoyant in a fluid. Where the sensors are floats, the device includes an upper locking spacer on the shaft above the upper float, a lower locking spacer on the shaft below the lower float, and a middle locking spacer on the shaft between the upper float and the lower float.

A fluid level detection system comprises a fluid level detection device as described above. The proximal end of the shaft is sealingly affixed to an exterior surface of a fluid reservoir and the distal end extends into the fluid reservoir. A power supply is electrically connected to both of the first switch and the second switch through the multi-wire conductor. A low level indicator is electrically connected to the first switch. A system relay has a power input from the power supply, a control input from the second switch, an operation output to a device controller, and an indicator output to a shutdown indicator.

In the system, the first switch is in an open position when the upper sensor detects the fluid above a warning threshold and in a closed position when the upper sensor does not detect the fluid above the warning threshold. The low level indicator is in an off state when the first switch is in the open position and in an on state when the first switch is in the closed position.

The second switch is in a closed position when the lower sensor detects the fluid above a shutdown threshold and in an open position when the lower sensor does not detect the fluid above the shutdown threshold. The system relay electrically connects the second switch to the operation output and the device controller when the second switch is in the closed position. The indicator output and shutdown indicator are electrically disconnected from both the second switch and the power source when the second switch is in the closed position. The system relay electrically connects the power source to the indicator output and shutdown indicator when the second switch is in the open position. The operation output and the device controller are electrically disconnected from both the second switch and the power source when the second switch is in the open position.

The system further comprises an override switch electrically connected to the device controller, wherein the override switch connects the device controller to an alternate power source when the override switch is in a closed position.

The fluid level detection device comprises an elongated shaft having a proximal end and a distal end, wherein the proximal end of said shaft is sealingly affixed to an exterior surface of a reservoir and the distal end extends into the fluid reservoir, the distal end having an upper sensor and a lower sensor configured to detect a level of fluid in the reservoir, a first switch contained within the distal end and responsive to the upper sensor, a second switch contained within the distal end and responsive to the lower sensor.

BRIEF DESCRIPTION OF THE DRAWINGS

The accompanying drawings illustrate the invention. In such drawings.

DETAILED DESCRIPTION OF THE PREFERRED EMBODIMENTS

The present invention is directed to a reservoir fluid level detection system and device. The system and device may be used with any fluid reservoir in which the fluid may be consumed, lost or otherwise removed from the reservoir, in which the quantity of fluid must be maintained or replaced in order to continue operating a particular machine, engine or similar apparatus. The inventive device is designed to detect, prevent and minimize fluid loss in case of, as a result of, or to prevent component failure. Using a floating switch that is adjustable in height with multiple floats placed on a common stock and able to accommodate any type of fluid allows for the provision of multiple fluid level warnings and disengagement or stoppage of any device that may rely upon the fluid for operation or be a source of fluid leakage.

The individual floats are configured such that the top floats are wired for normally closed operation, e.g., fail to close, and provide power for warning lights and/or audible alarms upon such closure. The bottommost float is configured to be wired for normally open operation, e.g., fail to open, and is used to signal a relay, of any given voltage, which in turn shuts off any component drawing from the fluid in the reservoir. The component drawing from the fluid in the reservoir can be anything from a power take-off (PTO) driven hydraulic pump to an auxiliary engine, or even a stationary fluid pumping station. The reservoir fluid level detection device can trip any voltage and control any type of device, e.g., pneumatic, hydraulic or electric. The system has an override in case any part of the device may have to be moved in order to facilitate transport or repairs.

With concerns of hazardous material spillage at an all-time high and its effects on the environment, this device can minimize the impact of hazardous material fluid loss and possibly even stop it before suffering catastrophic consequences.

The present invention is directed to a fluid level detection device and system that uses at least two fluid level sensors disposed on an elongated shaft, which shaft extends into a reservoir so as to place the fluid level sensors in contact with a fluid contained within the reservoir. The sensors are configured to detect the level of fluid contained within the reservoir relative to both a warning threshold and a shut-down threshold. The fluid level sensors may comprise any type commonly used in the art, including pneumatic, conductive, or magnetic/mechanical floats. The choice of which type of sensor is used depends upon factors such as cost, type of fluid (i.e., corrosive, hazardous, etc.), or environment. The following description will focus on float-type sensors, but the aims of the invention can be met with any type of fluid level sensor.

Figure 1:
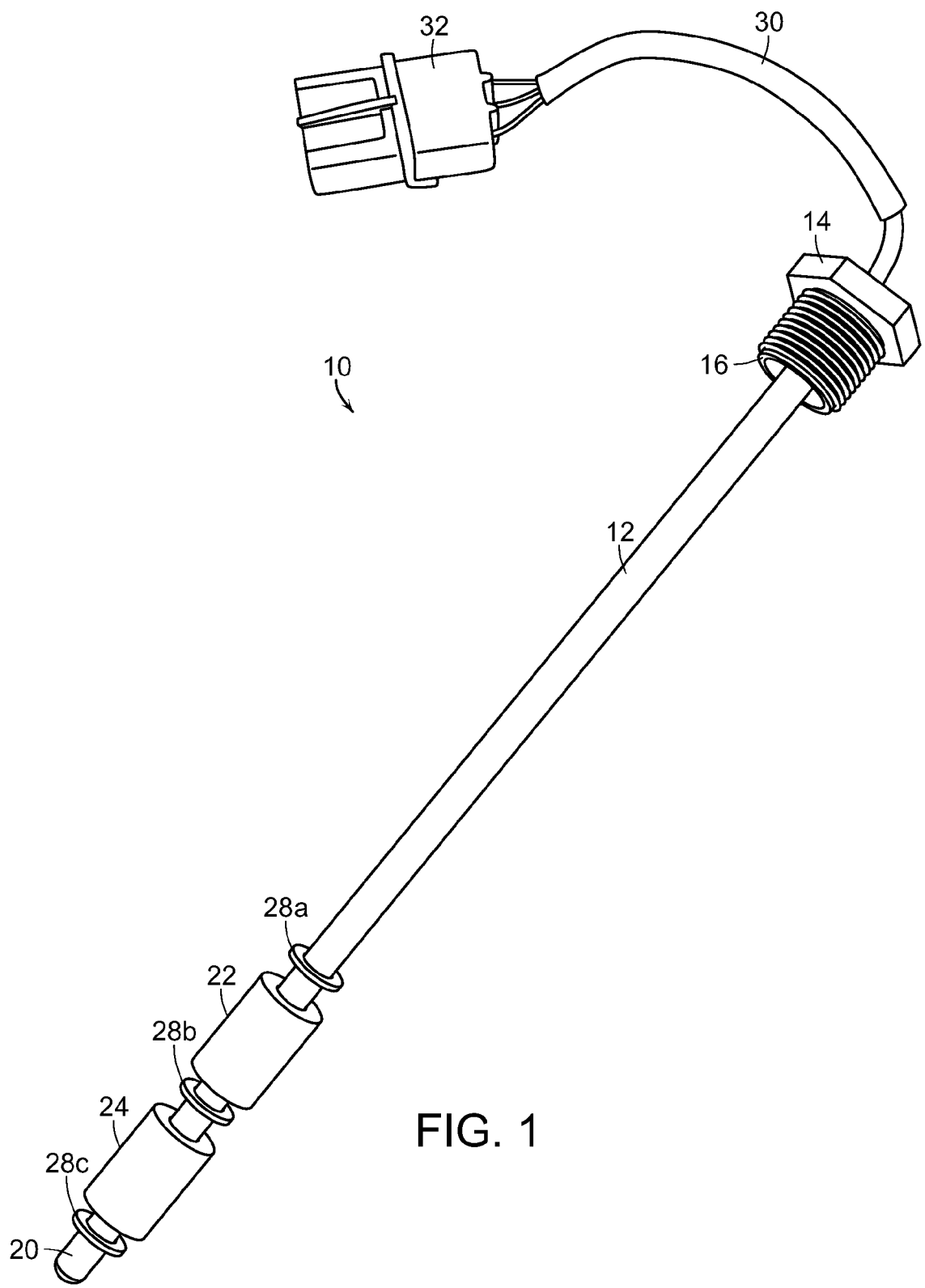
FIG. 1 is a photograph of a device designed to implement the reservoir fluid level detection system of the present invention.
Figure 2:
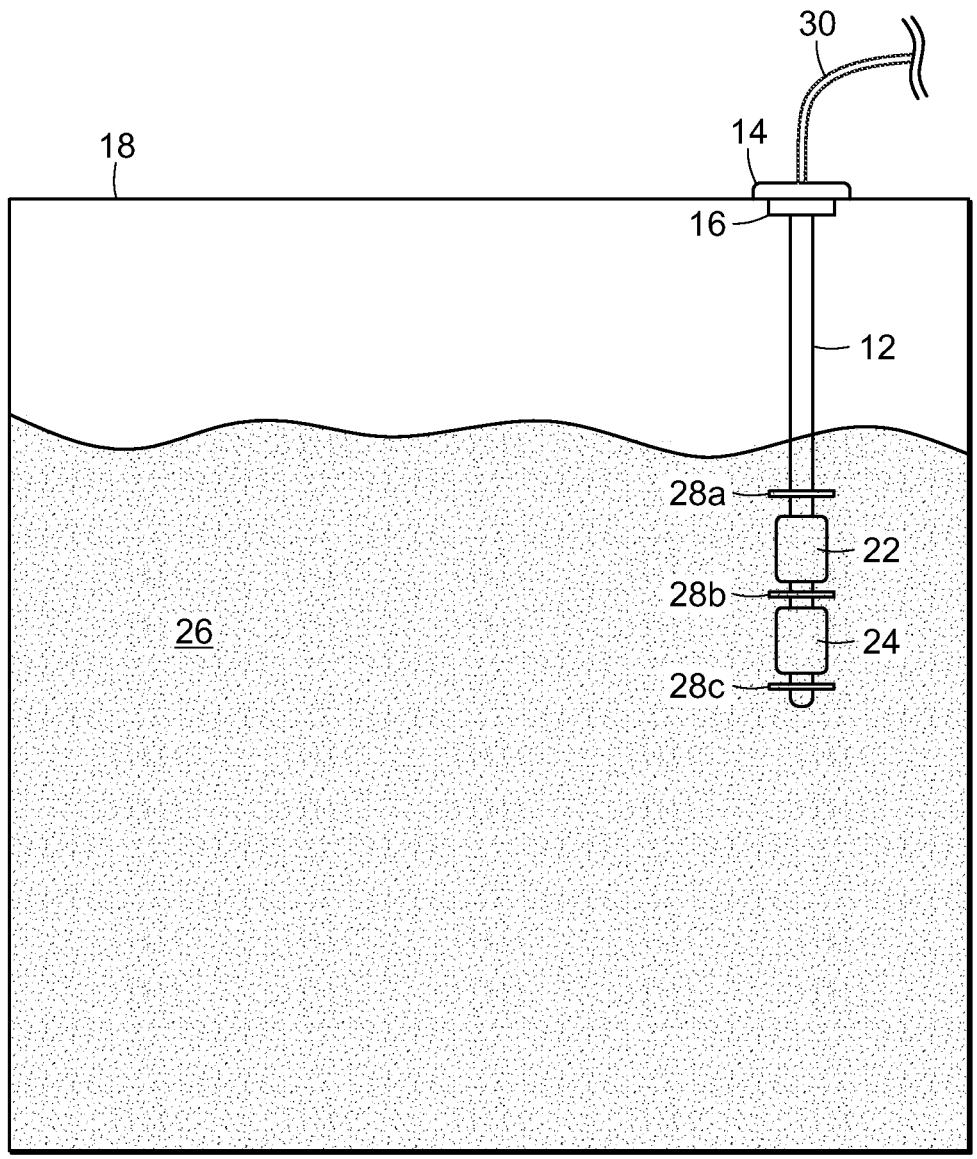
FIG. 2 is an illustration of the inventive fluid level sensing device installed in a fluid reservoir.

FIG. 1 is an illustration of a particularly preferred embodiment of the reservoir fluid level detection device 10 of the present invention. The device 10 comprises an elongated shaft 12 having a threaded coupling 14 at its proximate end 16. As shown in FIG. 2, the threaded coupling 14 is configured to secure the device 10 into the lid or other top of a reservoir 18 such that the shaft 12 extends vertically downward toward the bottom of the reservoir 18. The length of the shaft 12 is configured such that its distal end 20 is disposed just below usable fluid levels in the reservoir 18. The length of the shaft 12 is preferably adjustable to variably and more precisely place the distal end 20 in the reservoir 18 relative to fluid levels. The methods of adjustment will be described further below.

The distal end 20 of the shaft 12 has at least two floats 22, 24 configured to be slidable along a portion of the shaft 12. The first float 22 is preferably disposed above the second float 24. A person skilled in the art will realize that more than two floats may be used to activate multiple level sensors. However, the following description will focus on only the uppermost float 22 and the bottommost float 24.

The floats 22, 24 are in communication with switches disposed inside the shaft 12. Such communication is preferably a wireless, near field communication, e.g., electric or magnetic, so that the shaft 12 may be a closed system to prevent intrusion of the fluid 26 into the interior of the shaft 12. This allows for the device 10 to be used with hazardous or corrosive materials.

The floats 22, 24 are preferably restricted in their movement along the shaft by locking spacers 28 disposed on the shaft 12 both above and below each of the floats 22, 24. A multi-wire conductor 30 extends from the proximate end 16 of the shaft 12 through the threaded coupling 14. The multi-wire conductor 30 is electrically connected to a plurality of switches (not shown here) on the interior of the shaft 12 corresponding to the number of floats 22, 24. The other end of the multi-wire conductor 30 runs to a connector 32 that is configured to electrically connect the wire 30 to a remote or proximate control panel 34.

One method for adjusting the length of the shaft 12 is by way of the coupling 14. The coupling 14 may be slidable along the shaft 12 and have a compression or other locking feature such that it will hold the shaft 12 at a fixed depth within the reservoir 18 when the coupling 14 is secured. Other types of couplings 14 may be used to accomplish similar functionality. Another method to adjust the length of the shaft 12 is to make the position of the floats 22, 24, locking spacers 28, and switches 42, 44 variable along and within the shaft 12.

Figure 3:
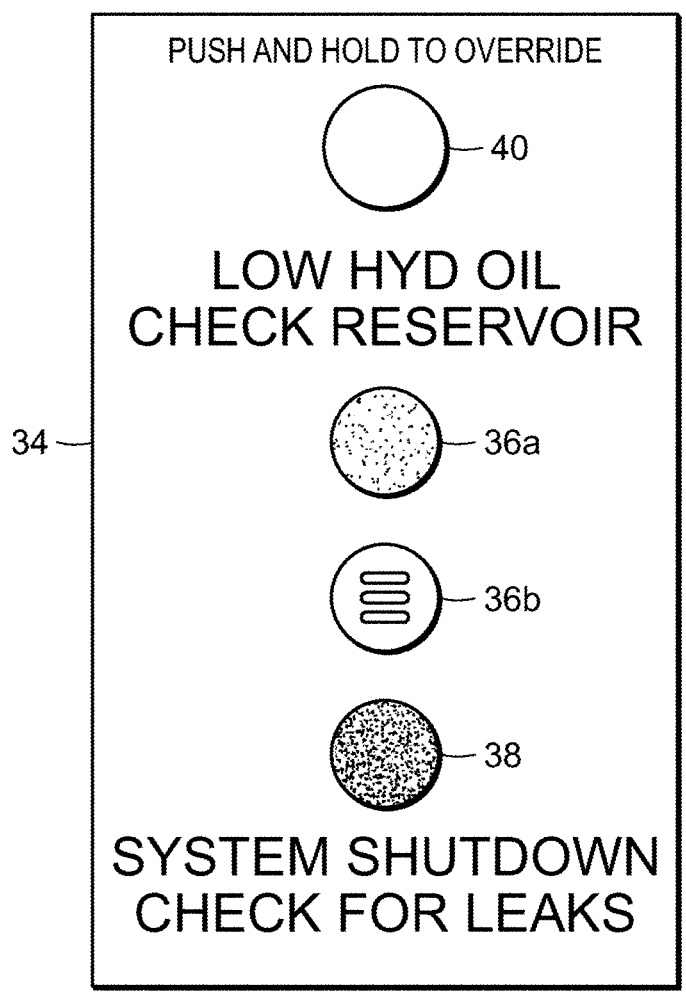
FIG. 3 is an illustration of a control panel cover for the reservoir fluid level detection system of the present invention.

As shown in FIG. 3, the control panel 34 includes a low fluid alert light 36 and a stop alert light 38. The control panel 34 also includes an override button 40. The operation of these lights and buttons will be described more fully below.

When the level of fluid 26 in the reservoir 18 is above both floats 22, 24, the uppermost float 22 rises up the shaft against the uppermost locking spacer 28a and the lowermost float 24 rises up the shaft against the middle locking spacer 28b. As the level of fluid 26 in the reservoir 18 decreases, the uppermost float 22 would be the first to lose buoyancy. As this buoyancy is lost, the uppermost float 22 slides down the shaft 12 until it meets middle locking spacer 28b. This movement of the uppermost float 22 from the upper locking spacer 28a to the middle locking spacer 28b causes the communication between the float 22 and the switch 42 inside the shaft 12 to move the switch 42 from an open state to a closed state.

As the level of fluid 26 continues to drop, the lowermost float 24 likewise loses buoyancy. As this buoyancy is lost, the lowermost float 24 also slides down the shaft 12 from the middle locking spacer 28b to the lower locking spacer 28c. In this case, the communication between the lowermost float 24 and the switch 44 inside the shaft 12 causes the switch 44 to move to an open state once the lowermost float 24 reaches the lower locking spacer 28c.

Figure 4:
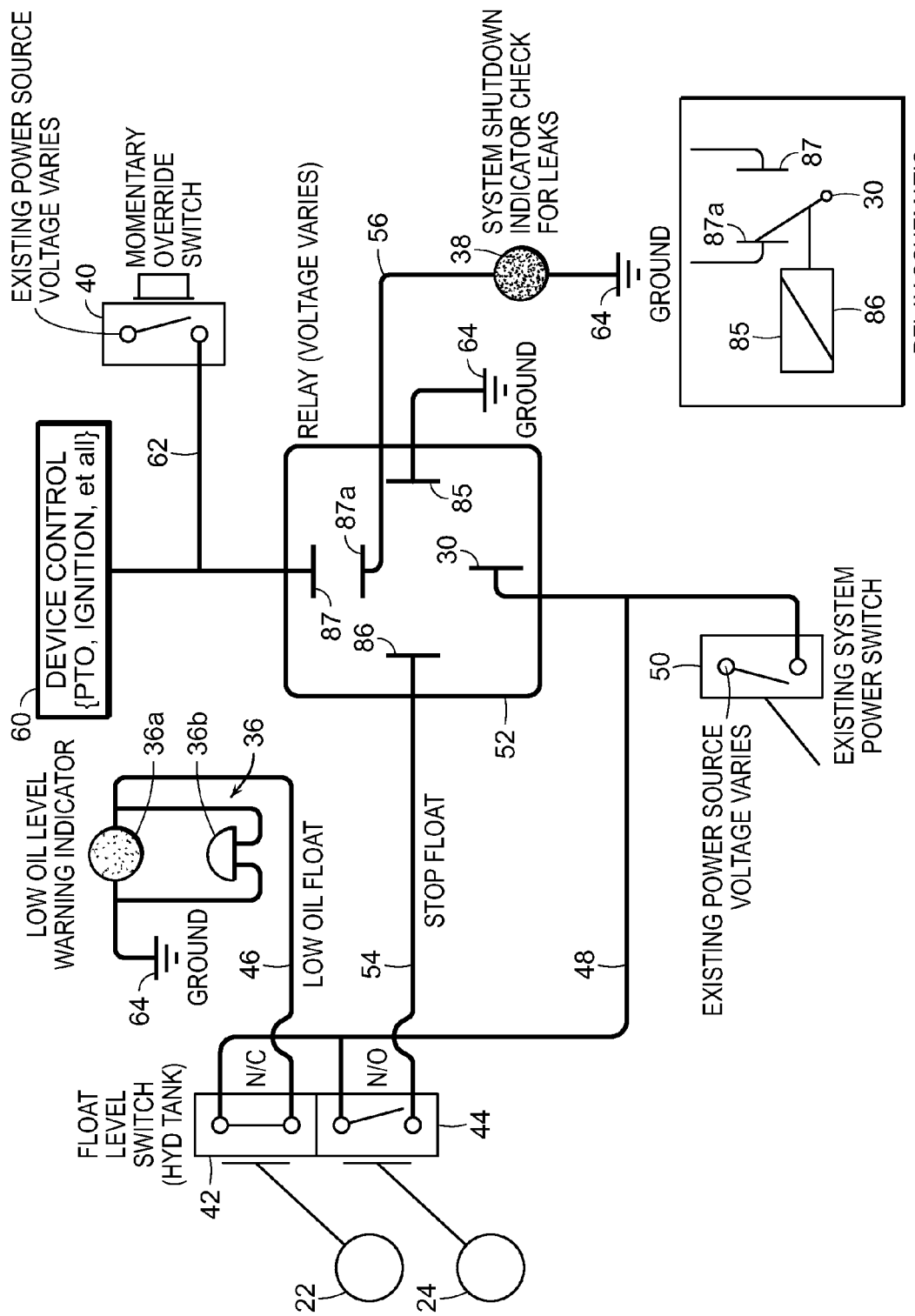
FIG. 4 is a schematic illustration of the electrical wiring and sensors of the reservoir fluid level detection system of the present invention.

Referring to FIG. 4, the electrical wiring and operation of the device 10 is illustrated and described. The float switches 42, 44 are associated with the first and second floats 22, 24 respectively. The first float switch 42 is configured for a default closed position (as illustrated) when the first float 22 is in the lowered position. One side of the first float switch 42 is electrically connected by a first conductor 46 to the low fluid level alert indicator 36, which may take the form of a light 36*a*, an alarm 36*b*, or both. The low fluid level alert light 36*a* preferably has a yellow or amber color, but may be any color designated to communicate the appropriate warning. The alarm 36*b* generates an audible warning of about seventy-two decibels or greater. The other side of the first float switch 42 is connected by a primary conductor 48 which is in turn connected to a device control switch 50 and a system relay 52.

In this illustration, the system switch 50 is the on/off switch for the system power source (not shown) which draws on the fluid in the reservoir 18. A person skilled in the art will realize that the switch 50 may comprise an on/off switch for any device or machine that may draw fluid from a reservoir. When the switch 50 is in the off (open) position as shown, electricity is not supplied to the system. When the switch 50 is in the on (closed) position, electricity is supplied from the ignition through the switch 50 to the system.

The second float switch 44 is configured for a default open position as shown when the second float 24 is in the lower position. One side of the second float switch 44 connects to the same primary conductor 48 that connects the first float switch 42 to the switch 50. The other side of the second float switch 44 is connected by a second conductor 54 to the system relay 52.

The system relay 52 has four main inputs/outputs. A first input is conducted from the switch 50 and is configured to supply electricity for the system relay 52 to direct to the various outputs. Another input is received from the second float switch 44 through the second conductor 54. As the second float 24 reaches the bottom locking spacer 28*c*, the second float switch 44 is opened and the second conductor 54 stops conducting electricity to the system relay 52. The system relay 52 has two main outputs. The first is to the control device 60. A typical control device would comprise a PTO solenoid valve or similar mechanism. When the second float switch 44 is in the closed position, the system relay 52 is configured to conduct electricity to the control device 60 such that the device may continue to draw fluid 26 from the reservoir 18. The second major output from the system relay 52 comprises shutdown conductor 56 which communicates with the stop alert indicator 38, preferably a light. When the second float switch 44 is in the open position, the system relay 52 is configured to conduct electricity through the shutdown conductor 56 to the stop alert light 38 and not to the control device 60. In this way the device is configured to automatically stop drawing fluid 26 from the reservoir 18. The stop alert light 38 is preferably red, but may be any color configured to communicate an emergency or shutoff of the system. The system includes an override switch 40 connected by override conductor 62 to the electrical ignition and the control device 60. The override switch 40 has an electrical connection to the ignition so as to provide electricity when in override. Appropriate ground connections 64 are arranged throughout the system.

In operation, as the first float 22 reaches the lower position, the first float switch 42 is closed connecting the electricity through primary conductor 48 to the low fluid level alert light 36*a* and/or alarm 36*b*, activating the same. At this time, the second float 24 is still in the up position and the second float switch 44 is closed so as to conduct electricity away from the stop alert light 38 and continue conducting electricity through the relay 52 to the control device 60. As the fluid level continues to drop, the second float 24 reaches the lower position opening the second float switch 44. Upon this occurrence, electricity is no longer conducted through the second conductor 54 to the relay 52. Electricity is instead supplied through only the primary conductor 48 where the relay 52 is configured to trip the stop alert light 38 and stop conducting electricity to the control device 60. In this way, the system automatically shuts off the device 60, stopping the flow of fluid from the reservoir 18 to the control device 60.

The override switch 40 is configured to provide a separate supply of electricity to the control device 60 without passing through the system relay 52. The override switch 40 fails to an open position and is only closed when a user activates the switch or depresses a button.

Although several embodiments have been described in detail for purposes of illustration, various modifications may be made without departing from the scope and spirit of the invention. Accordingly, the invention is not to be limited, except as by the appended claims.

What is claimed is:

1. A fluid level detection system, comprising:
    a fluid level detection device comprising: an elongated shaft; an upper sensor and a lower sensor both independently disposed on a distal end of the shaft; a first switch fixedly disposed within the distal end of the shaft proximate to and responsive to the upper sensor; a second switch fixedly disposed within the distal end of the shaft proximate to and responsive to the lower sensor; and a multi-wire conductor having a wire connector, said multi-wire conductor electrically coupled to the first and second switches, wherein a proximal end of said shaft is sealingly affixed to an exterior surface of a fluid reservoir and the distal end extends into the fluid reservoir;
    a power supply electrically connected to both of the first switch and the second switch;
    a low level indicator electrically connected to the first switch;
    a system relay having a power input from the power supply, a control input from the second switch, an operation output to a device controller, and an indicator output to a shutdown indicator; and
    an override switch electrically connected to the device controller, wherein the override switch connects the device controller to an alternate power source when the override switch is in a closed position.

2. The system of claim 1, wherein the upper and lower sensors comprise upper and lower floats slidingly disposed on the distal end of the shaft, wherein both of the upper and lower floats are buoyant in a fluid; and further comprising an upper locking spacer on the shaft above the upper float, a lower locking spacer on the shaft below the lower float, and a middle locking spacer on the shaft between the upper float and the lower float.

3. The system of claim 1, wherein the first switch is in an open position when the upper sensor detects the fluid above a warning threshold and in a closed position when the upper sensor does not detect the fluid above the warning threshold.

4. The system of claim 3, wherein the low level indicator is in an off state when the first switch is in the open position and in an on state when the first switch is in the closed position.

5. The system of claim 1, wherein the second switch is in a closed position when the lower sensor detects the fluid above a shutdown threshold and in an open position when the lower sensor does not detect the fluid above the shutdown threshold.

6. The system of claim 5, wherein the system relay electrically connects the second switch to the operation output and the device controller when the second switch is in the closed position.

7. The system of claim 6, wherein the indicator output and shutdown indicator are electrically disconnected from both the second switch and the power source when the second switch is in the closed position.

8. The system of claim 5, wherein the system relay electrically connects the power source to the indicator output and shutdown indicator when the second switch is in the open position.

9. The system of claim 8, wherein the operation output and the device controller are electrically disconnected from both the second switch and the power source when the second switch is in the open position.

10. A fluid level detection system, comprising:
  a fluid level detection device comprising an elongated shaft having a proximal end and a distal end, wherein the proximal end of said shaft is sealingly affixed to an exterior surface of a reservoir and the distal end extends into the fluid reservoir, the distal end having an upper sensor and a lower sensor configured to detect a level of fluid in the reservoir, a first switch contained within the distal end and responsive to the upper sensor, a second switch contained within the distal end and responsive to the lower sensor;
  a power supply electrically connected to both of the first switch and the second switch;
  a low level indicator electrically connected to the first switch;
  a system relay having a power input from the power supply, a control input from the second switch, an operation output to a device controller, and an indicator output to a shutdown indicator; and
  an override switch electrically connected to the device controller, wherein the override switch connects the device controller to an alternate power source when the override switch is in a closed position.

11. The system of claim 10, wherein the upper and lower sensors comprise upper and lower floats slidingly disposed on the distal end of the shaft, wherein both of the upper and lower floats are buoyant in a fluid; and further comprising an upper locking spacer on the shaft above the upper float, a lower locking spacer on the shaft below the lower float, and a middle locking spacer on the shaft between the upper float and the lower float.

12. The system of claim 10, wherein the first switch is in an open position when the upper sensor detects the fluid above a warning threshold and in a closed position when the upper sensor does not detect the fluid above the warning threshold; and wherein the low level indicator is in an off state when the first switch is in the open position and in an on state when the first switch is in the closed position.

13. The system of claim 10, wherein the second switch is in a closed position when the lower sensor detects the fluid above a shutdown threshold and in an open position when the lower sensor does not detect the fluid above the shutdown threshold; wherein the system relay electrically connects the second switch to the operation output and the device controller when the second switch is in the closed position; and wherein the system relay electrically connects the power source to the indicator output and shutdown indicator when the second switch is in the open position.

14. The system of claim 13, wherein the indicator output and shutdown indicator are electrically disconnected from both the second switch and the power source when the second switch is in the closed position; and wherein the operation output and the device controller are electrically disconnected from both the second switch and the power source when the second switch is in the open position.

15. A fluid level detection system, comprising:
  a fluid level detection device comprising an elongated shaft having a proximal end and a distal end, wherein the proximal end of said shaft is sealingly affixed to an exterior surface of a reservoir and the distal end extends into the fluid reservoir, the distal end having an upper sensor and a lower sensor configured to detect a level of fluid in the reservoir, a first switch contained within the distal end and responsive to the upper sensor, a second switch contained within the distal end and responsive to the lower sensor;
  a power supply electrically connected to both of the first switch and the second switch;
  a low level indicator electrically connected to the first switch;
  a system relay having a power input from the power supply, a control input from the second switch, an operation output to a device controller, and an indicator output to a shutdown indicator;
  an override switch electrically connected to the device controller, wherein the override switch connects the device controller to an alternate power source when the override switch is in a closed position;
  wherein the first switch is in an open position when the upper sensor detects the level of fluid above a warning threshold and in a closed position when the upper sensor does not detect the level of fluid above the warning threshold; and
  wherein the second switch is in a closed position when the lower sensor detects the fluid above a shutdown threshold and in an open position when the lower sensor does not detect the fluid above the shutdown threshold.

16. The system of claim 15, wherein the upper and lower sensors comprise upper and lower floats slidingly disposed on the distal end of the shaft, wherein both of the upper and lower floats are buoyant in a fluid; and further comprising an upper locking spacer on the shaft above the upper float, a lower locking spacer on the shaft below the lower float, and a middle locking spacer on the shaft between the upper float and the lower float.

17. The system of claim 15, wherein the low level indicator is in an off state when the first switch is in the open position and in an on state when the first switch is in the closed position; and wherein the system relay electrically connects the second switch to the operation output and the device controller when the second switch is in the closed position; and wherein the system relay electrically connects the power source to the indicator output and shutdown indicator when the second switch is in the open position.

18. The system of claim 17, wherein the indicator output and shutdown indicator are electrically disconnected from both the second switch and the power source when the second switch is in the closed position; and wherein the operation output and the device controller are electrically disconnected from both the second switch and the power source when the second switch is in the open position.

* * * * *